(No Model.)

A. J. BLOOD & W. J. COLE.
CARBON SLATING.

No. 392,305. Patented Nov. 6, 1888.

UNITED STATES PATENT OFFICE.

ANSON J. BLOOD AND WILLIAM J. COLE, OF RED OAK JUNCTION, IOWA.

CARBON SLATING.

SPECIFICATION forming part of Letters Patent No. 392,305, dated November 6, 1888.

Application filed March 30, 1888. Serial No. 268,934. (No specimens.)

*To all whom it may concern:*

Be it known that we, ANSON J. BLOOD and WILLIAM J. COLE, citizens of the United States, residing at Red Oak Junction, in the county of Montgomery and State of Iowa, have invented certain new and useful Improvements in Carbon Slating; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to artificial stone; and it consists in certain ingredients combined in a certain way to produce an excellent substitute for slate, whether for roofing, paving, school-slates, or any other purpose to which slate is ordinarily put.

Our invention will be readily understood from the following description and claim and upon reference to the accompanying drawings, in which—

Figure 1:
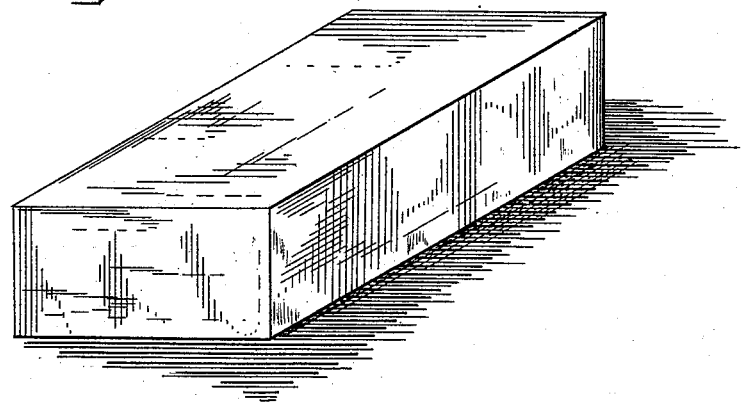
Figure 2:
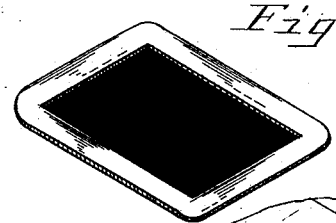
Figure 3:
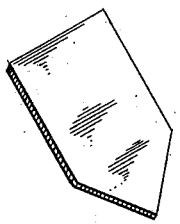
Figure 4:
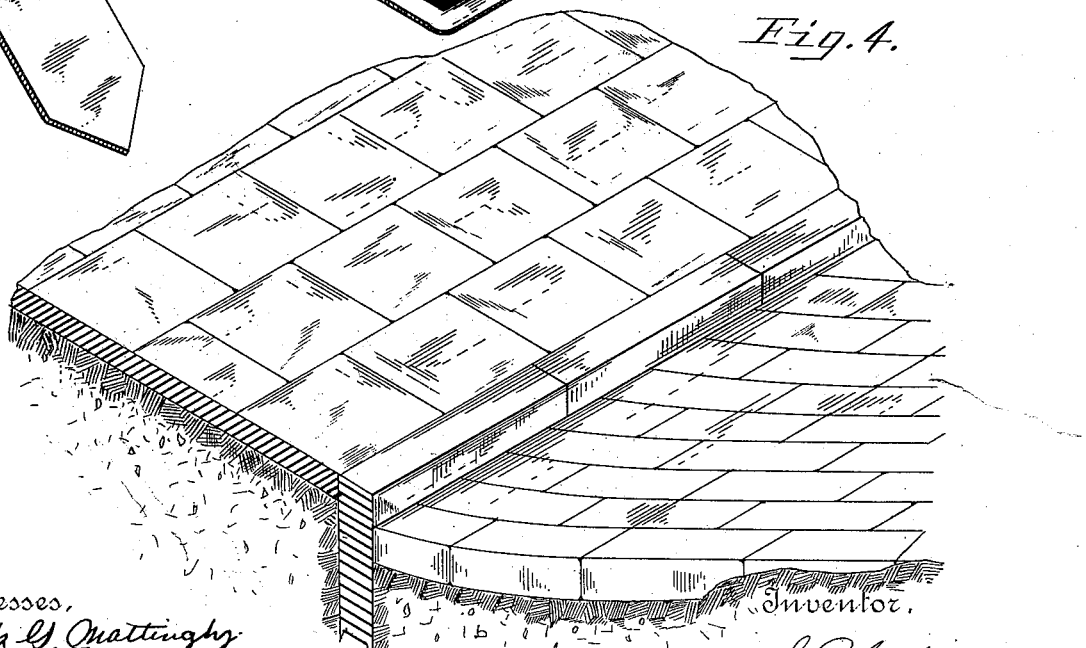

Figure 1 represents a block of our improved composition. Fig. 2 shows a school-slate composed of our composition. Fig. 3 is a roofing-tile of the same, and Fig. 4 shows how it can be used for pavements and sidewalks.

Our composition is made up of the following ingredients in the proportions named, by avoirdupois weight:

| | | |
|---|---|---|
| Lamp-black | 1 part or | .82 per cent. |
| Asphaltum | 1 part or | .82 per cent. |
| Sand (common fine) | 4 parts or | 3.28 per cent. |
| Emery | 4 parts or | 3.28 per cent. |
| Charcoal | 16 parts or | 13.12 per cent. |
| Potter's clay | 48 parts or | 39.34 per cent. |
| Resin | 48 parts or | 39.34 per cent. |
| | 122 parts or | 100.00 per cent. |

The compound is made by mixing together the lamp-black, asphaltum, and resin and then boiling the mixture. The sand, emery, charcoal, and clay are reduced to powder and sifted into the boiling mixture, stirring well together, until of the consistency of mush. The composition is then cast into the required shape by pouring it into suitable molds. After casting, and as soon as the surface has become sufficiently cool and firm to lose its adhesive quality, a light pressure is brought to bear upon it, in any convenient manner, by weights or by mechanism. When cold, it is removed from the mold and dressed or smoothed by the application of water and soap or ammonia or lye. This slating is strong and durable, and can be made at an almost nominal cost. It can be colored by adding any common coloring-material, and may be made of a different color on each side, if desired. It is impervious to water and is not affected by cold. It is non-combustible, except at a very high temperature. Its surface is soft and velvety, yet at the same time very durable. It will not waste away in use. It can be cut by a saw or a knife or penetrated by ordinary drills. It is used for inside or outside walls for buildings, for roofing, for street-pavements, and sidewalks. It is especially fitted for blackboard purposes, and can, in fact, be used for any purpose for which natural slating is employed.

Having thus described our invention, what we claim, and desire to secure by Letters Patent, is—

The above-described artificial slate, composed of lamp-black, asphaltum, sand, emery, charcoal, clay, and resin, combined in the proportions stated, and for the purpose set forth.

In testimony whereof we affix our signatures in presence of two witnesses.

ANSON J. BLOOD.
WILLIAM J. COLE.

Witnesses:
J. M. JUNKIN,
R. D. SPERRY.